US009971582B2

(12) United States Patent
Nandakumar et al.

(10) Patent No.: US 9,971,582 B2
(45) Date of Patent: May 15, 2018

(54) SELECTING APPLICATION WRAPPER LOGIC COMPONENTS BASED ON FEATURES OF A MOBILE APPLICATION TO BE WRAPPED

(71) Applicant: CA, INC., New York, NY (US)

(72) Inventors: Vikrant Nandakumar, Karnataka (IN); Naveen Harry Michael, Karnataka (IN); Hemanth Kumar Pinninti, Andhra Pradesh (IN)

(73) Assignee: CA, INC., New York, NY (US)

( * ) Notice: Subject to any disclaimer, the term of this patent is extended or adjusted under 35 U.S.C. 154(b) by 57 days.

(21) Appl. No.: 14/747,757

(22) Filed: Jun. 23, 2015

(65) Prior Publication Data

US 2016/0378447 A1    Dec. 29, 2016

(51) Int. Cl.
*G06F 9/45*     (2006.01)
*G06F 11/36*    (2006.01)
*G06F 9/44*     (2018.01)
*G06F 21/00*    (2013.01)

(52) U.S. Cl.
CPC ............... *G06F 8/53* (2013.01); *G06F 8/315* (2013.01); *G06F 11/3672* (2013.01); *G06F 21/00* (2013.01); *G06F 8/71* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

2004/0163077 A1*  8/2004  Dimpsey .......... G06F 11/3466
                                              717/130
2012/0159570 A1*  6/2012  Reierson ............. G06F 21/53
                                              726/2
2014/0157228 A1*  6/2014  Pasternak ............. G06F 8/30
                                              717/106
(Continued)

OTHER PUBLICATIONS

Prabhu et al., Smart Containerization, 2014 (Year: 2014) pp. 1-13.*
(Continued)

*Primary Examiner* — S. Sough
*Assistant Examiner* — Zhan Chen
(74) *Attorney, Agent, or Firm* — Sage Patent Group

(57) ABSTRACT

Executable code of an application package is decompiled to provide a decompiled application package. Features of the application package are identified based on content of the decompiled application package. A set of wrapper logic components are selected from among a library of wrapper logic components based on the features of the application package. The decompiled application package is disassembled to provide disassembled code. Wrapper program hooks are inserted into the disassembled code to provide modified disassembled code. The modified disassembled code is assembled to provide modified assembled code. The wrapper logic components of the set are combined with the modified assembled code to form a wrapped application package including executable code from the modified assembled code and executable code from the wrapper logic components of the set that intercept calls by the executable code from the modified assembled code.

10 Claims, 7 Drawing Sheets

(56) References Cited

U.S. PATENT DOCUMENTS

| | | | | |
|---|---|---|---|---|
| 2014/0181803 A1* | 6/2014 | Cooper | ............ | G06F 8/60 717/178 |
| 2015/0082298 A1* | 3/2015 | Wang | ............ | G06F 8/60 717/174 |
| 2015/0370553 A1* | 12/2015 | Ben-Haim | ............ | G06F 8/68 717/169 |
| 2016/0283198 A1* | 9/2016 | Walker | ............ | G06F 8/30 |

OTHER PUBLICATIONS

CDW, Mission Critical: Managing Mobile Applications & Content, 2014 (Year: 2014) pp. 1-8.*

* cited by examiner

SELECTING APPLICATION WRAPPER LOGIC COMPONENTS BASED ON FEATURES OF A MOBILE APPLICATION TO BE WRAPPED

FIELD

The inventive concepts described herein relate to software applications for mobile computing devices. In particular, the inventive concepts relate to wrapping of software applications with application wrappers that monitor, test and/or manage the software applications.

BACKGROUND

Applications developed for mobile devices are distributed in an application package containing the elements needed to run the application, such as the program code, resources, certificates and a manifest.

In some cases, it is desirable for an entity such as an application designer, application owner, or enterprise administrator to exercise control over the operation of an application. For example, it may be desirable to exercise control over what features or elements of a device or operating system that the application can access, what time of day those features or elements can be accessed, what security policies are applied to the application, etc.

To accomplish this, the program code of the application may be modified to include code that performs or links to monitoring and control functions. This modification is referred to as "application wrapping." When an application is wrapped, a layer of code is added to the application binary file to add features or modify behavior of the application without making changes to the internal application code. The addition of wrapping code may reduce the risk to an enterprise of improper or unauthorized use of an application. For example, wrapping can add security and management features to an application before it is deployed to the enterprise. Moreover, wrapping can enable tracking of application feature usage and reporting of related metrics and problems.

SUMMARY

Some embodiments of the present disclosure are directed to a method of performing operations on a processor of an application wrapper computer. Features of the application package are identified based on content of the decompiled application package. A set of wrapper logic components are selected from among a library of wrapper logic components based on the features of the application package. The decompiled application package is disassembled to provide disassembled code. Wrapper program hooks are inserted into the disassembled code to provide modified disassembled code. The modified disassembled code is assembled to provide modified assembled code. The wrapper logic components of the set are combined with the modified assembled code to form a wrapped application package including executable code from the modified assembled code and executable code from the wrapper logic components of the set that intercept system calls by the executable code from the modified assembled code.

Some other embodiments of the present disclosure are directed to a computing device that includes a processor in a memory coupled to the processor and storing computer readable program code that when executed by the processor causes the processor to perform operations. The operations include: decompiling executable code of an application package to provide a decompiled application package; identifying features of the application package based on content of the decompiled application package; selecting a set of wrapper logic components from among a library of wrapper logic components based on the features of the application package; disassembling the decompiled application package to provide disassembled code; inserting wrapper program hooks into the disassembled code to provide modified disassembled code; assembling the modified disassembled code to provide modified assembled code; and combining the wrapper logic components of the set with the modified assembled code to form a wrapped application package including executable code from the modified assembled code and executable code from the wrapper logic components of the set that intercept system calls by the executable code from the modified assembled code.

Other methods, computing devices, and computer program products according to embodiments of the present disclosure will be or become apparent to one with skill in the art upon review of the following drawings and detailed description. It is intended that all such methods, computing devices, and computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
FIG. 1 is a block diagram illustrating the packaging and installation of an application on a computing device.

FIG. 1 shows example development flow for an application developed using the Android operating system and distributed in a package file, such as an Android Package File. An application project 10 includes various files needed to build an application, including source code, libraries, resources, and certificates. The source code is compiled into binary executable code that is packaged along with the associated resources and manifest into an application package 12.

An application is typically written in a high level programming language, such as Java. During compilation and packaging, the source code may be first compiled into a binary format and then converted into a format appropriate for the operating system on which the application is to be used. For example, for a Java application running on an Android platform, the source code is first compiled into class files in the Java bytecode format, which are then converted into ".dex" files in the Dalvik bytecode. The Dalvik bytecode is the native format of the Android operating system.

The application package 12, such as an Android Package in the ".apk" format, is then generated including the binary program code in ".dex" files, along with associated resources and a manifest file. During installation onto a device 14, the operating system of the device 14 reads the manifest file and unpacks and installs the program code and associated resources from the .apk file on the device 14. The device 14 may be an end-user device such as a smart phone, tablet computer, laptop computer, desktop computer, appliance terminal (e.g., thermostat), etc.

Figure 2:
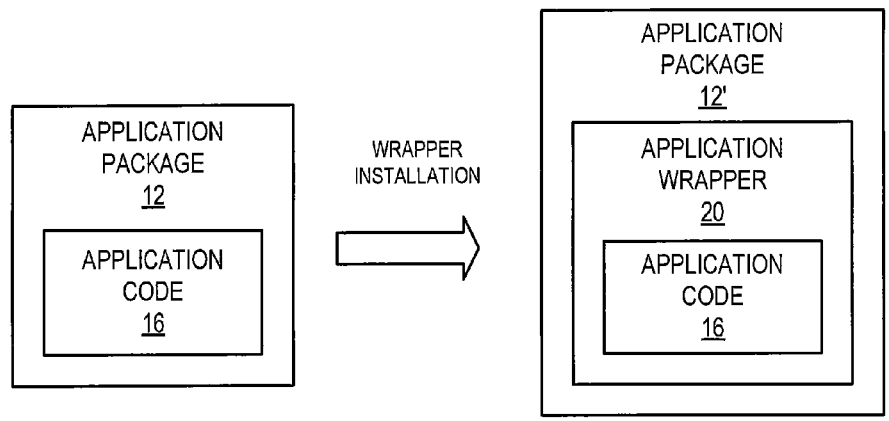
FIG. 2 is a block diagram illustrating installation of an application wrapper that encapsulates application code.

Installation of an application wrapper is illustrated in FIG. 2. As shown therein, before wrapping, an application package 12 includes application code 16. The modified application package 12' is generated that in includes the application wrapper 20 installed "around" to encapsulate the application code 16. The application code 16 is typically modified to include hooks (program code) that facilitate integration with the application wrapper 20. When the application package 12' is installed on a device, the operating system installs the application code 16 wrapped by the application wrapper 20 onto the device.

Figure 3:
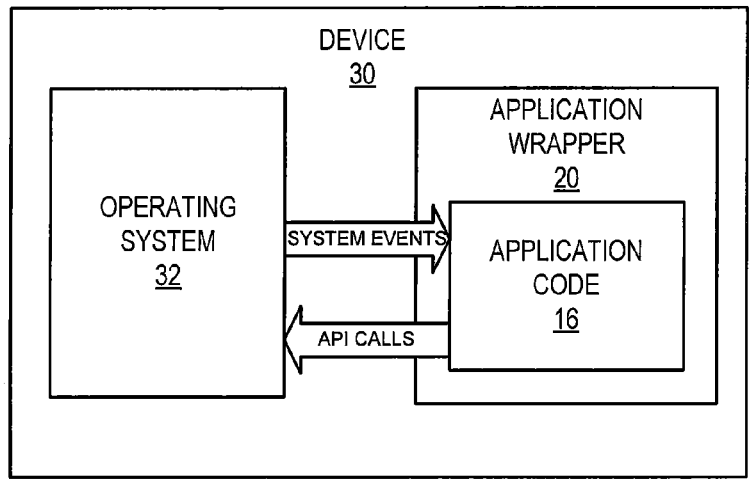
FIGS. 3 and 4 are block diagrams illustrating operation of an application wrapper encapsulating application code.

FIG. 3 illustrates operation of the application wrapper 20 encapsulating the application code 16 on a device 30 which includes an operating system 32. The operating system 32 notifies the application code 16 of system events associated with the application. A system event is an action of the system that must be handled by the program, such as "launch app", "OnStart", "OnStop", etc. For example, the operating system 32 may generate a "launch app" event in response to a user tapping on an app in the user interface of the device 30. System events are processed by a listener function in the application code 16. When an application wrapper 20 is installed, however, the application wrapper 20 may intercept system events and determine if an action should be taken in response to the system event. For example, the application wrapper 20 may record the system event, generate a notification in response to the system event, etc.

The logic of the application wrapper 20 may also determine whether or not the system event should be passed along to the application code 16. Accordingly, the application wrapper 20 may implement logic that listens for system events provided to the application code 16. Note that the listener function of the application code 16 may be left in place to processes system events that are passed through to the application code 16 by the application wrapper 20.

For example, the operating system 32 may generate an "onResume" event which is intercepted by the application wrapper 20. If the logic in the application wrapper 20 determines that the application 16 is not authorized to resume, then the application wrapper 20 blocks the event by not forwarding it to the listener function in the application code 16.

The application wrapper 20 may also intercept application programming interface (API) calls made by the application code 16 to the operating system 32. The application code 16 issues an API call to request services from the operating system 32. For example, an API call may be used to turn on a camera, to read data from storage, to display an image on a screen, or to invoke any other functionality provided by the operating system 32.

The application wrapper 20 may pass the API call along to the operating system 32. Before the API call is passed to the operating system 32, the logic of the application wrapper 20 determines if any action needs to be taken in response to the API call and may also determine whether or not to pass the API call along to the operating system 32.

In general, the application wrapper 20 includes executable code that monitors and/or controls behavior of the application code 16 by intercepting one or more API calls by the application code 16, executes monitoring and/or control code in response to the API call, and thereafter returns control to the application code 16 and/or passes the API call to the operating system 32 for processing.

For example, in case the application wrapper 20 is designed to limit access to a feature or resource on the device 30 during a designate time frame the application wrapper 20 may intercept an API call from the application code 16 that invokes the feature and, if the API call is made outside the designated time frame, generate and return an error code to the application code 16 instead of passing the API call on to the operating system 32.

Figure 4:
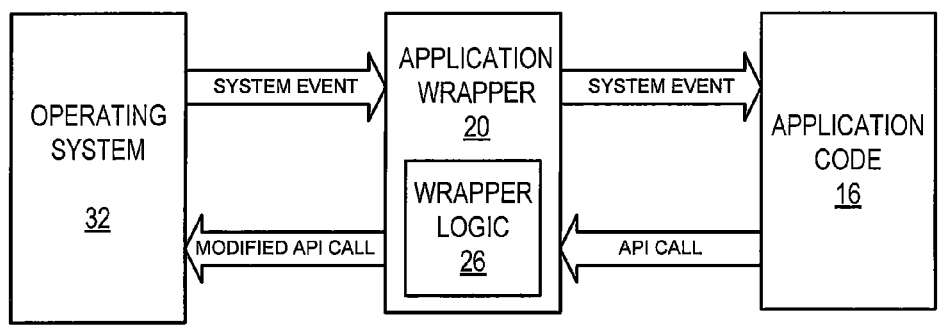

FIG. 4 illustrates the relationship between the operating system 32, the application wrapper 20 and the application code 16 in more detail. In particular, the application wrapper 20 includes wrapper logic 26 that determines how intercepted system events and API calls are processed by the application wrapper 20.

As shown in FIG. 4, the application wrapper 20 intervenes between the operating system 32 and the application code 16 and filters and/or operates on system events and API calls passing between the operating system 32 and the application code 16. When a system event is generated and sent to the application code 16 by the operating system 20, a first listener function in the application wrapper 20 intercepts the system event and passes it to the wrapper logic 26. The wrapper logic 26 determines how to respond to the system event and whether or not to pass the system event along to the application code 16.

A second listener function in the application wrapper 20 listens for API calls from the application code 16, and passes the API calls to the wrapper logic 26. The wrapper logic 26 determines how to respond to the API call, whether to modify the API call, and whether or not to pass the API call or the modified API call along to the operating system 32.

For example, assume that the application code 16 issues a system log API call to log an event that occurred during operation of the application code 16 to a system log. The wrapper logic 26 may determine that the event should be logged to a separate event log, and may modify the API call to log the event to the separate event log rather than to the system log.

It will be appreciated that many different types of wrapping/instrumentation tools are offered by various vendors. For example, application monitoring tools are available, such as Flurry, CA Mobile Application Analytics, Tealeaf and Cassandra. Testing tools, such as IBM Rational Test Workbench Mobile, MonkeyTalk, Jamo, SeeTest and Squish are also available, while management applications are also available, such as CA Mobile Application Management, AirWatch, MobileIron and Fibrelink. In some cases, it is desirable to apply two different wrapping applications to a single application program so that, for example, the application can be both monitored and managed simultaneously.

Figure 5:
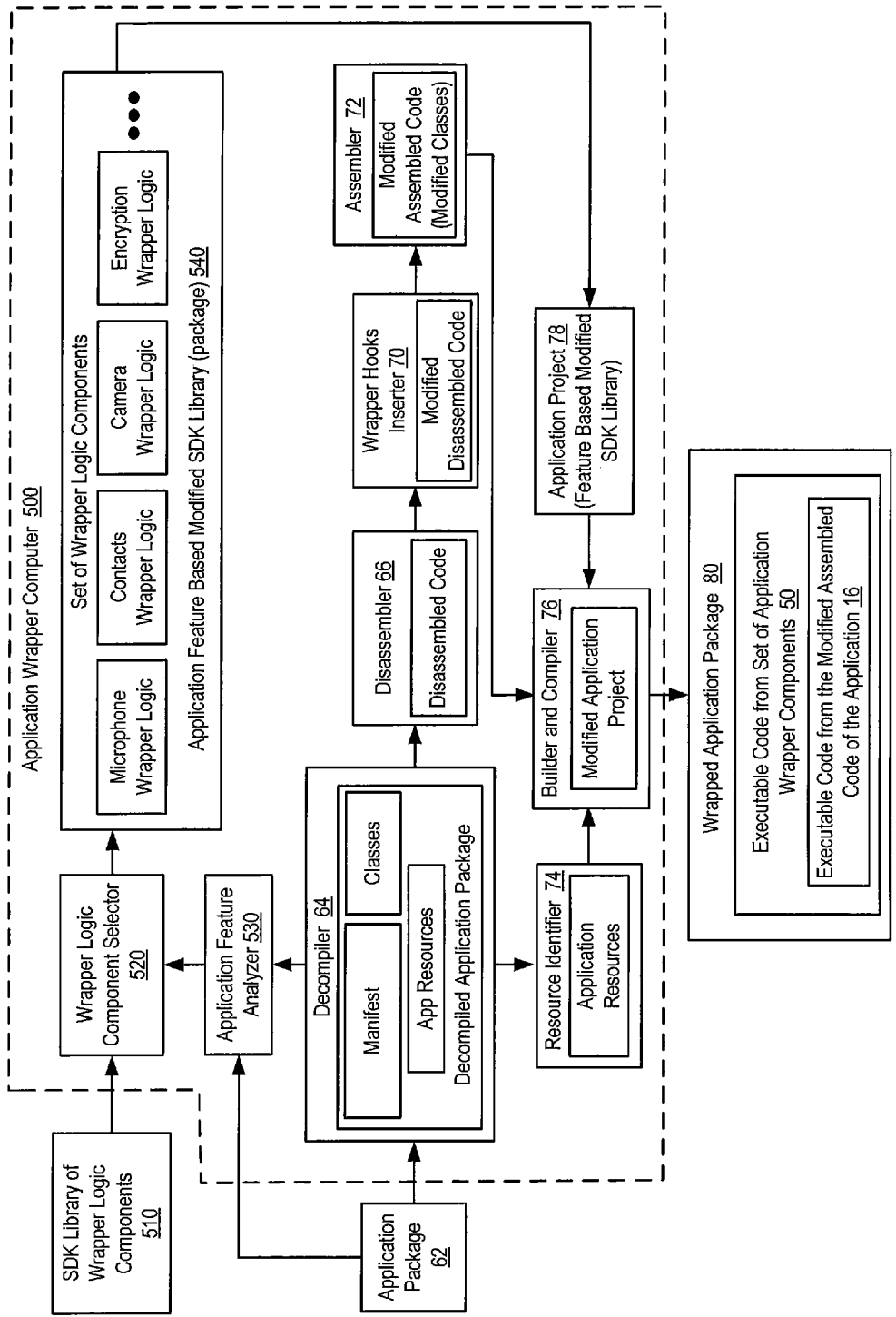
FIG. 5 is a block diagram illustrating operations and data flows of an application wrapper computer to generate a wrapped application package.
Figure 6:
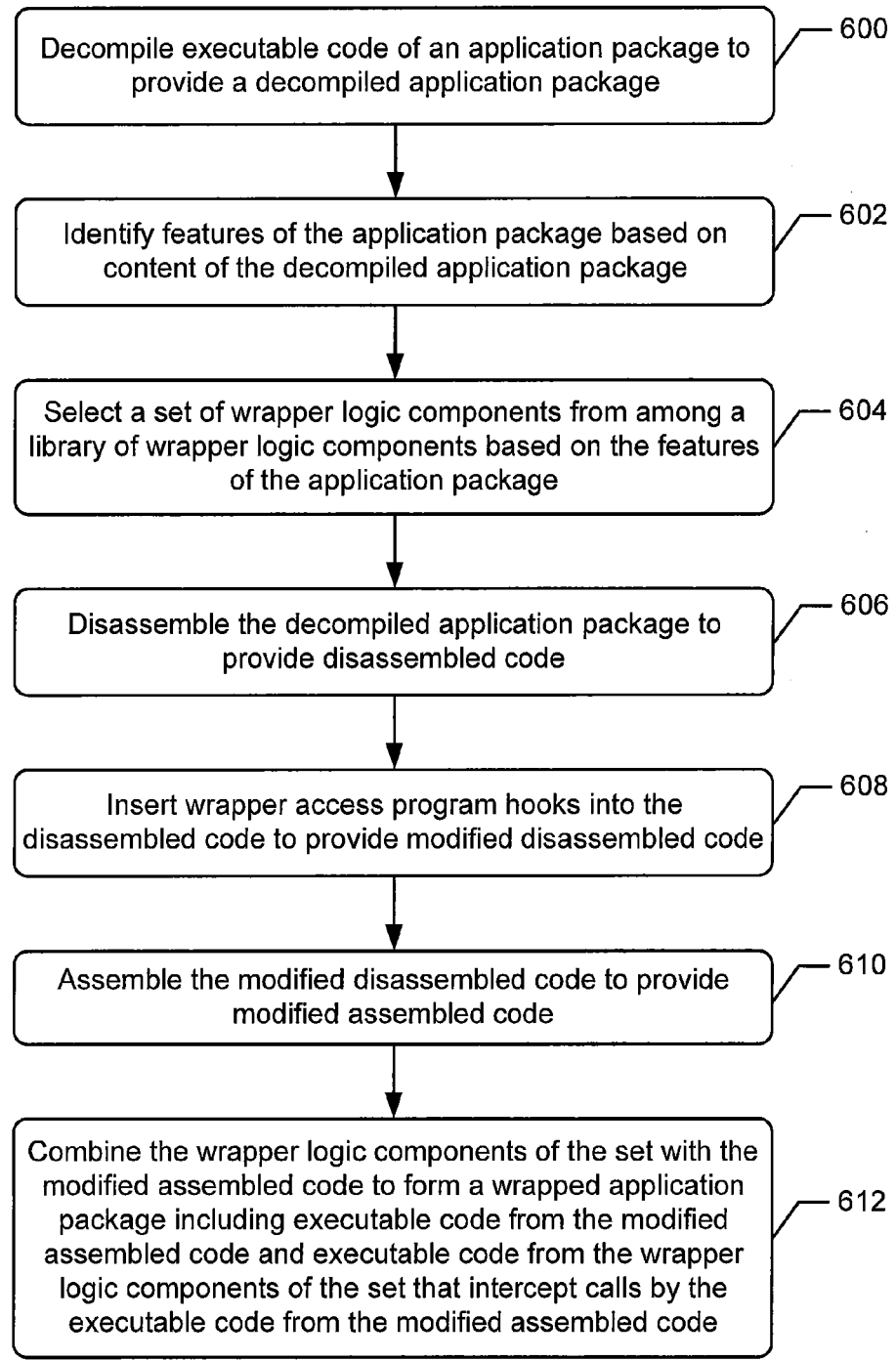
FIGS. 6-8 are flowcharts of operations by an application wrapper computer to generate a wrapped application package according to some embodiments.
Figure 7:
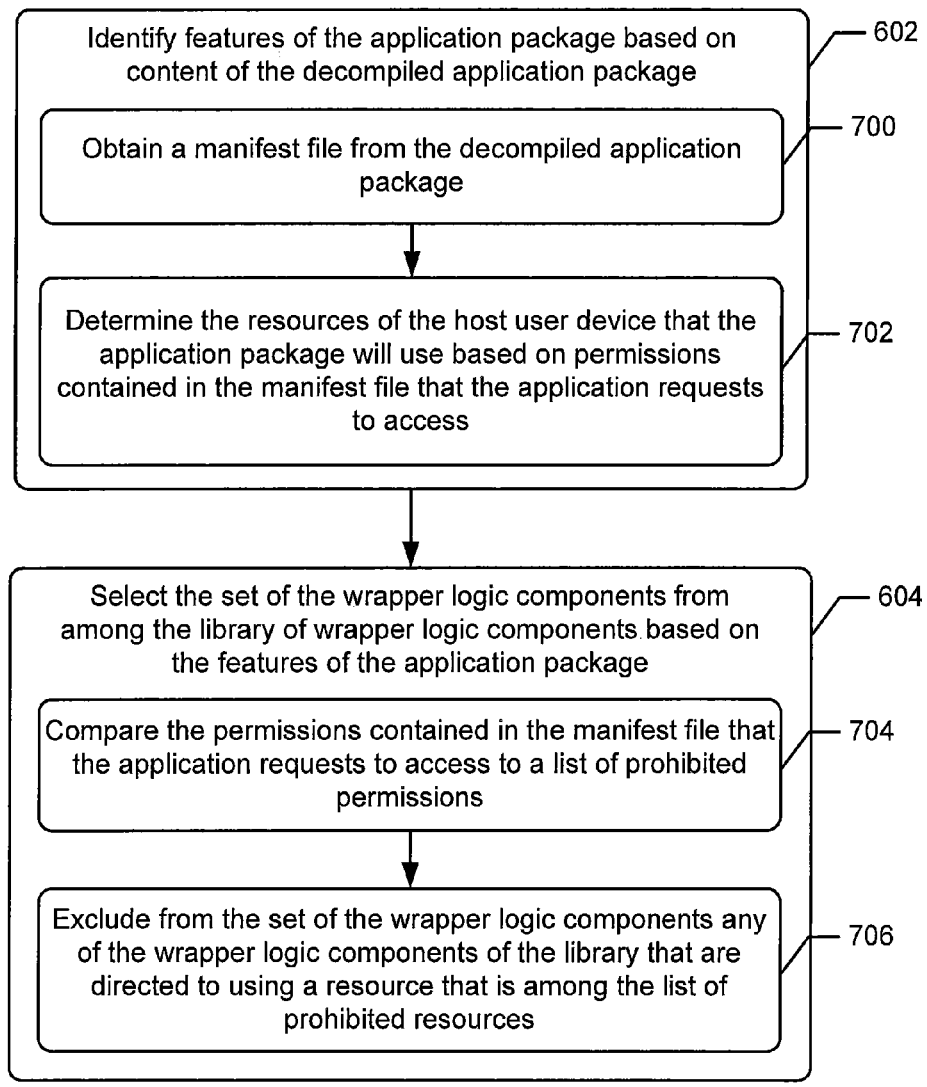
Figure 8:
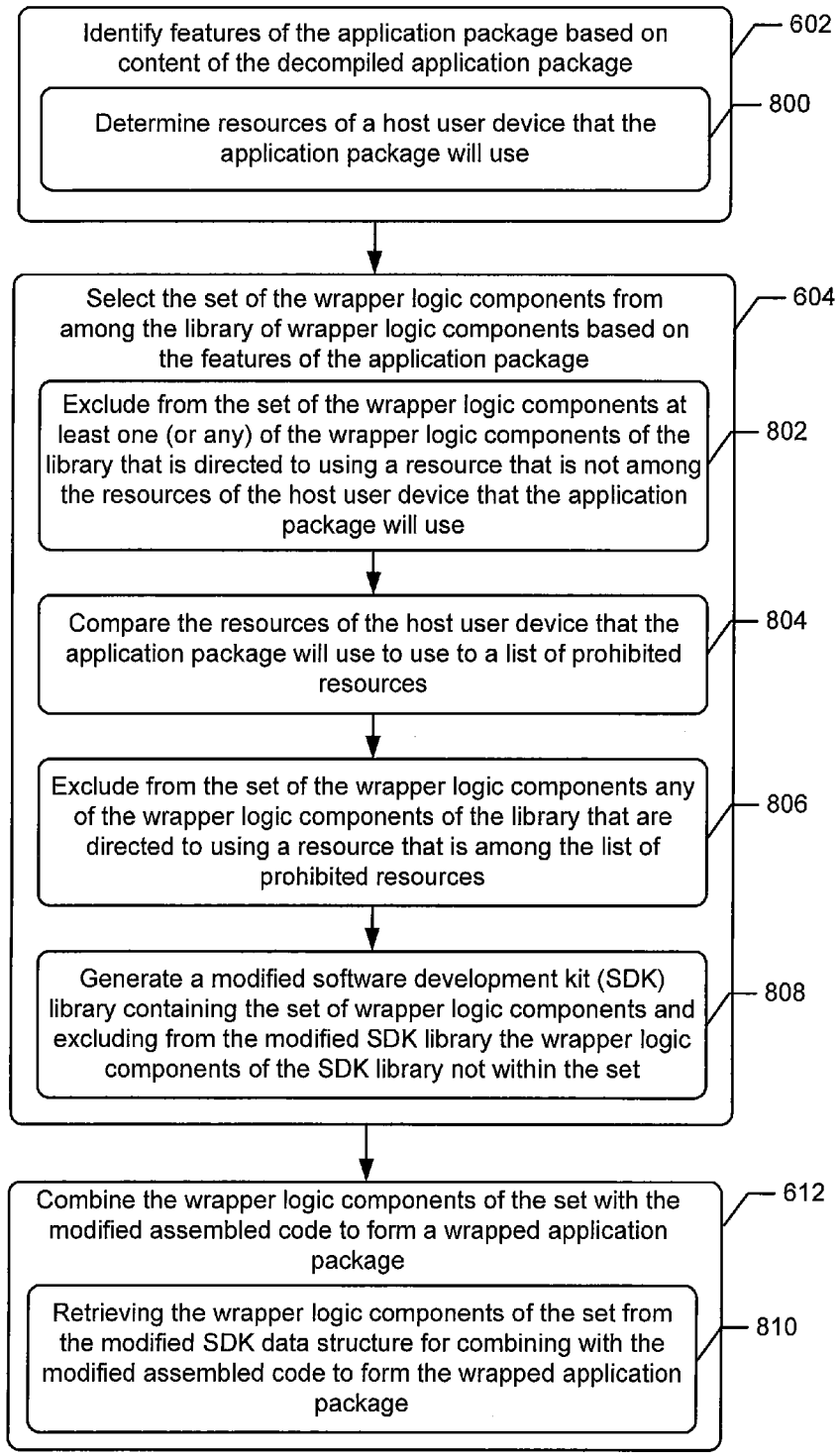

FIG. 5 is a block diagram illustrating operations and data flows of an application wrapper computer 500 to generate a wrapped application package 80. FIGS. 6-8 are flowcharts of operations by the application wrapper computer 500 to generate the wrapped application package 80 according to some embodiments. Referring to FIGS. 5 and 6, executable code of an application package 62 is decompiled (Block 600) using a decompiler 54, such as apktool, to provide a decompiled application package. The decompiled application package may include an XML format manifest, a set of application resources, and classes. The classes file may by a binary source code file, which, for a Java application written for the Android operating system, can be Java classes compiled to Dalvik VM bytecode in .dex format. The decompiled application package is disassembled (Block 606), e.g., by a disassembler 66, to provide disassembled code. For example, binary source code of the application is extracted from the decompiled application package 64, and a disassembler 66 for .dex files, such as smali, disassembles the binary source code to .smali format to produce disassembled code, e.g., disassembled source code. Smali files are an assembly format that is native to dex or Dalvik bytecode.

A wrapper hooks inserter 70 analyzes the disassembled code to determine what modifications need to be made to accommodate the wrapper logic components from a software development kit (SDK) library. The wrapper hooks inserter 70 then inserts (Block 608) necessary wrapper program hooks into the disassembled code to provide modified disassembled code, which may be in the .smali format. The wrapper program hooks enable the wrapper logic components to intercept events and API calls involving the application for processing, such as described above regarding FIGS. 3 and 4.

The modified disassembled code is then assembled (Block 610) by an assembler 72, such as baksmali, to provide modified assembled code, which may include modified classes in the .dex format. Application resources can be extracted from the decompiled application package by a resource identifier 74. A builder and complier 76 combines the modified assembled code together with application resources and files of an application project 78, such as a software development kit (SDK) library, to form a wrapped application package 80 that can be ready to be installed on a target device, such as an end-user device. For an Android application, the wrapped application package 80 can include an .apk file.

Various embodiments of the present disclosure arise from the present realization that there is tremendous diversity of types of applications and having a myriad of functionalities. Using the same application project 78 irrespective of functionality of the particular application that is to be built can result in unnecessary increase in the size of the wrapped application package 80, degradation of user experience when the wrapped application package 80 is executed by a device, and/or improper operation (e.g., crashes) of the wrapped application package 80 when executed on the device. Wrapping an application with wrapper logic results in a wrapped application package 80 having increased storage size from the original application package 62. For example, when an application is wrapped using mobile application management, its size may increase at least 25 percent. Moreover, multiple levels of wrapping may be needed to provide various functionalities, with each level of wrapping adding additional storage requirements. Wrapping can degrade the user experience due to, for example, increased usage of the device's processing resources, storage resources, network indication resources, battery power, etc.

However, various embodiments disclosed herein may overcome one or more of these potential limitations on device operation and user experience by building the wrapped application package 80 using an application project 78 that contains a feature-based modified SDK library of wrapper logic components. In the embodiment of FIG. 5, the application wrapper computer 500 includes an application feature analyzer 530, a wrapper logic component selector 520, and an application project 78 that includes a feature-based modified SDK library.

The application feature analyzer 530 identifies (Block 602) features of the application package 62 based on content of the decompiled application package. A set of wrapper logic components are selected (Block 604) from among a library 510 of wrapper logic components, e.g., a SDK library, based on the features of the application package 62. The wrapper logic components of the set are then combined (Block 612) with the modified assembled code to form the wrapped application package 80 which includes executable code 16 from the modified assembled code and executable code 50 from the wrapper logic components of the set that intercept calls by the executable code 16 (e.g., to the operating system 32) and/or that intercept system event messages (e.g., from the operating system 32) to the executable code 16. The executable code 50 from the wrapper logic components of the set may intercept any number types of calls by the executable code 16 and/or intercept any number types of system event messages to the executable code 16. It is to be understood that the executable code 50 is not necessarily configured to intercept all types of calls by the executable code 16 or intercept all types of system event messages to the executable code 16.

The library 510 can be a SDK library. The wrapper logic component selector 520 may select the set of wrapper logic components from among the SDK library by generating a modified SDK library 540 containing the set of wrapper logic components selected from among the SDK library 510 of wrapper logic components, and excluding from the modified SDK library 540 at least one of the wrapper logic components of the SDK library 510 that is directed to a feature that is not among the features of the application package. The modified SDK library 540 is also referred to as an application feature based modified SDK library or package because it contains wrapper logic components that have been selected from among the wrapper logic components of the SDK library 510 based on the determined features of the application.

The builder and compiler 76 uses the feature based modified SDK library 540 as part of an application project 78 that is combined (Block 612) with the modified assembled code from assembler 72 to form (build) the wrapped application package 80. The builder and compiler 76 may retrieve all of the wrapper logic components of the set from the feature based modified SDK library 540 for combining with the modified assembled code to form the wrapped application package 80. The wrapped application package 80 can contain executable code from the set of application wrapper components 50, compiled from the feature based modified SDK library 540, and executable code compiled from the modified assembled code.

FIG. 7 illustrates operations of the application feature analyzer 530 and the wrapper logic component selector 520 in accordance with some additional or alternative embodiments. Referring to FIG. 7, the application feature analyzer 530 may identify (Block 602) features of the application package 62 by obtaining (Block 700) a manifest file from the decompiled application package, and determining (Block 702) the resources of the host user device that the application package will use based on content of the manifest file.

The resources of the host user device that the application package will use may be determined based on permissions contained in the manifest file that the application requests to access. For example, the application feature analyzer 530 may identify associations between labels identified by the permissions to resources that have been defined as being associated with wrapper logic components of the library.

The wrapper logic component selector 520 may select (Block 604) the set of the wrapper logic components from among the library 510 of wrapper logic components based on comparing (Block 704) the permissions contained in the manifest file to a list of prohibited permissions, and excluding (Block 706) from the set of the wrapper logic components any of the wrapper logic components of the library that request to access a permission that is among the list of prohibited permissions. Again, the application feature based SDK library 540 is generated based on the selected set of the wrapper logic components.

Example permissions that may be identified by the application feature analyzer 530 from the manifest file can include one or more of the following:

uses-permission: android.permission.CAMERA
uses-permission: android.permission.RECORD_AUDIO
uses-permission: android.permission.WRITE_EXTERNAL_STORAGE
uses-permission: android.permission.READ_PHONE_STATE
uses-permission: android.permission.ACCESS_COARSE_LOCATION
uses-permission: android.permission.INTERNET
uses-permission: android.permission.WAKE_LOCK
uses-permission: android.permission.ACCESS_FINE_LOCATION The application feature analyzer 530 may correspondingly determine from the permissions and other information contained in the manifest file that features of the application need to access resources of the host user device that include: a camera, a photo library, a microphone, an external storage device interface (e.g., USB, Lightning, etc.), phone interface and/or contacts, location services, Internet services, encryption, etc.

The wrapper logic component selector 520 can then select wrapper logic components from the SDK library 510 for inclusion in the set of the application feature based modified SDK library 540 based on the list of identified features of the application. The set can therefore include wrapper logic components that are needed to control and/or monitor application calls to the camera, the photo library, the microphone, the external storage device interface, phone interface and/or contacts, location services, Internet, and encryption services. Similarly, the set can include wrapper logic components that are needed to control and/or monitor system events from the camera, the photo library, the microphone, the external storage device interface, phone interface and/or contacts, location services, Internet, and encryption services that are to be communicated to the application. At least some, or in some embodiments all, of the wrapper logic components from the SDK library 510 that are not needed for controlling and/or monitoring such calls and/or system events are excluded from the set of wrapper logic components selected to form the application feature based modified SDK library 540.

The application feature analyzer 530 may identify (Block 602) features of the application package 62 by tracing operational flows through decompiled application code of the decompiled application package, and identify the features of the application package based on comparison of the operational flows to defined rules. For example, the defined rules may identify characteristics of operational flows having defined functionality, which functionality causes the wrapper logic component selector 520 to select certain wrapper logic components from the library 510 for inclusion in the set. By way of example, an operational flow that accesses a data storage structure used to manage stored photos is identified as using a device's photo library functionality.

The application feature analyzer 530 may alternatively or additionally identify (Block 602) features of the application package 62 by identifying characteristics of application interfaces of the decompiled application code of the decompiled application package, and identifying the features of the application package based on the characteristics of the application interfaces of the decompiled application code of the decompiled application package.

For example, the application feature analyzer 530 may determine from a manifest file, from tracing operational flows, and/or identifying application interfaces that an email application, such as Microsoft Outlook, does not use a camera, but will need access to other resources that include: Contacts library, Internet, microphone, speaker, copy & paste functions, file "Open In" function, and an external interface to accessories.

The selector 520 may, for each of the features, count the operational flows that will use the feature, and exclude from the set of the wrapper logic components any of the wrapper logic components of the library 510 that is directed to any of the features that does not have a count that satisfies a rule for a threshold number of the operational flows that will use the feature. Accordingly, rules may be defined which cause the selector 520 to not use an identified feature to select a wrapper logic component of the library 510 for inclusion in the set if the identified feature is not used by at least the threshold number of the operational flows. Features that are used by at least the threshold number of the operational flows can be deemed core features to the operation of the application that should be monitored and/or controlled through wrapper logic components, while features used by less than the threshold number of the operational flows can be deemed non-core features that are not to be monitored and/or controlled through wrapper logic components.

In some further embodiments, the wrapper logic component selector 520 estimates an amount of processor, memory, and/or network communication resource utilization overhead that will be caused to a host device, e.g., end-user device, by operation of a wrapper logic component monitoring a particular one of the features while the application is executed by the host device. The estimate may be based on determination of an execution cycle rate of an operation flow that uses the particular one of the features. The estimate may be further based on a determination of the processor, memory, and/or network communication resource utilization created by each cycle of the wrapper logic component to monitor and/or control an identified number of calls by and/or system events to the operation flow within the identified execution cycle. The wrapper logic component selector 520 then determines whether the wrapper logic component for the particular one of the features is to be included in the set of the modified SDK library 540 based on the estimated amount of processor, memory, and/or network communication resource utilization. For example, a wrapper logic component for a particular one of the features may be excluded from the modified SDK library 540 if the associated estimate of amount of processor utilization exceeds a processor overhead value, if the associated estimate of amount of memory utilization exceeds a memory overhead value, and/or if the associated estimate of amount of network communication exceeds a network communication value.

FIG. 8 illustrates operations of the application feature analyzer 530 and the wrapper logic component selector 520 in accordance with some additional or alternative embodiments. Referring to FIG. 8, the application feature analyzer 530 may identify (Block 602) features of the application package 62 by determining (Block 800) resources of a host device that the application package will use. The resources used by the application will be the resources that are used while the application is executed by the host device after the wrapped application package 80 has been installed on the host user device.

The wrapper logic component selector 520 can select (Block 604) the set of the wrapper logic components from among the library 510 of wrapper logic components based on the features of the application package using one or more of the operations of Blocks 802-808. The wrapper logic component selector 520 may exclude (Block 802) from the set of the wrapper logic components at least one of the wrapper logic components of the library 510 that is directed to using a resource that is not among the resources of the host user device that the application package will use. The selector 520 may exclude (Block 802) from the set of the wrapper logic components any of the wrapper logic components of the library 510 that are directed to using a resource that is not among the resources of the host user device that the application package will use.

The wrapper logic component selector 520 may compare (Block 804) the resources of the host user device that the application package will use to a list of prohibited resources, and exclude (Block 806) from the set of the wrapper logic components any of the wrapper logic components of the library 510 that are directed to using a resource that is among the list of prohibited resources.

The library 510 can be a SDK library. The wrapper logic component selector 520 generates (Block 808) the feature based modified SDK library 540 containing the set of wrapper logic components selected from among the software development kit library of wrapper logic components, and excludes from the feature based modified SDK library 540 at least one of the wrapper logic components of the SDK library 510 that is directed to a feature that is not among the features of the application package. The builder and compiler 76 combines (Block 612) the wrapper logic components of the feature based modified SDK library 540 with the modified assembled code from assembler 72 to form (build) the wrapped application package 80. The builder and compiler 76 may retrieve (Block 810) all of the wrapper logic components of the set from the feature based modified SDK library 540 for combining with the modified assembled code to form the wrapped application package 80. The wrapped application package 80 can contain executable code of the set of application wrapper components 50, which is compiled from the feature based modified SDK library 540, and modified executable code of the application 16, which is compiled from the modified assembled code.

Figure 9:
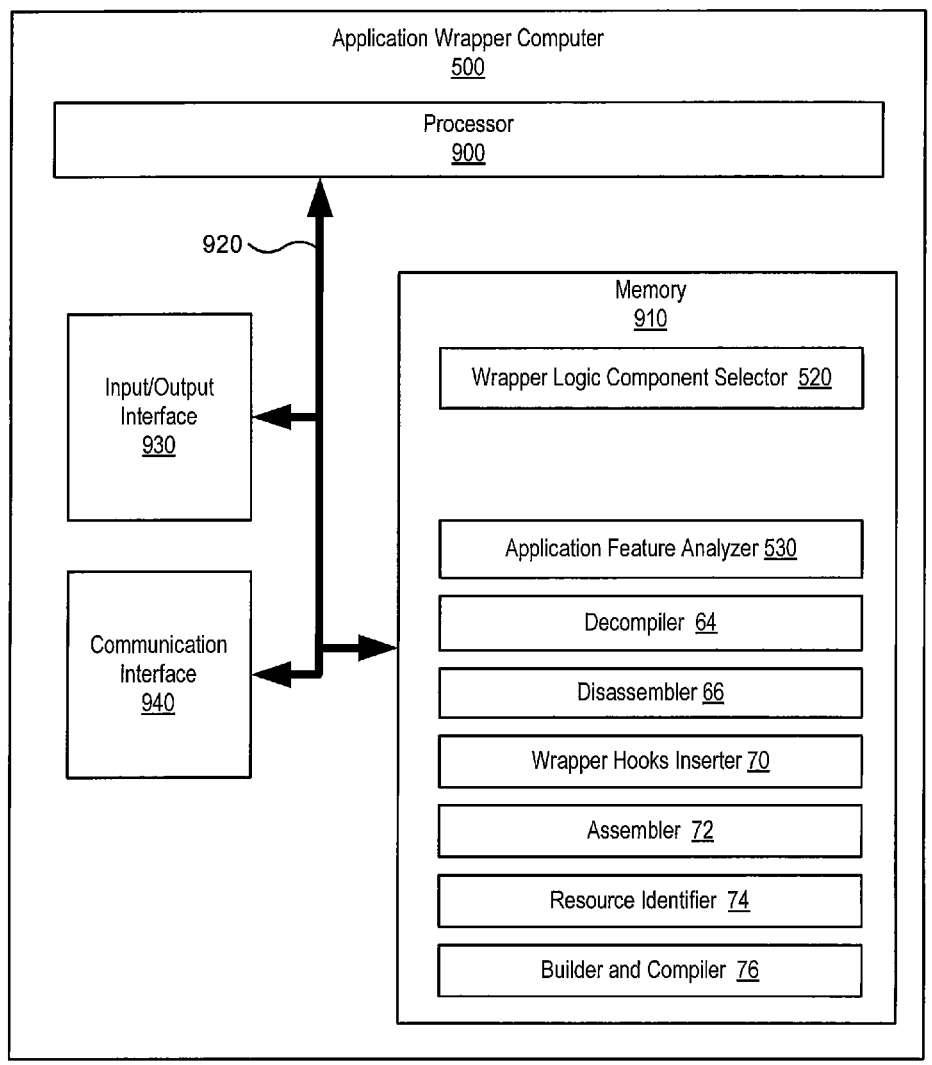
FIG. 9 is a block diagram of an application wrapper computer that generates a wrapped application package according to some embodiments.

FIG. 9 is a block diagram of an application wrapper computer 500 that generates a wrapped application package according to some embodiments. The application wrapper computer 500 is a computing device that includes a processor 900, such as a microprocessor, microcontroller, etc., that controls operation of the computer 500. The processor 900 communicates with a memory 910, an input/output interface 930 and a communication interface 940 via a system bus 920.

The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 910, described below as a non-transitory computer readable medium, to perform at least some of the operations described herein as being performed by an electronic device. The program code can include the wrapper logic component selector 520, the application feature analyzer 530, the decompiler 64, the disassembler 66, the wrapper hooks inserter 70, the assembler 72, the resource identifier 74, and the builder and compiler 76.

Although some operations are described herein as being executed by a processor, the operations are not necessarily executed by the same processor. In other words, at least one processor may executed the operations described herein and illustrated by the accompanying drawings.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of an application wrapper computer:

decompiling executable code of an application package to provide a decompiled application package;

tracing a plurality of operational flows through decompiled application code of the decompiled application package, each operational flow associated with at least one application programming interface (API) of the decompiled application package;

identifying features of the application package based on content of the decompiled application package, by obtaining a manifest file from the decompiled application package, and determining resources of a host user device that the application package will use based on permissions contained in the manifest file for at least one API call of the API associated with a request by the application to access the feature;

selecting a set of wrapper logic components from among a library of wrapper logic components based on the features of the application package by:

determining, for each feature, a parameter value representative of a number of operational flows of the application package that contain an API call associated with a request by the application to access the feature; and excluding from the set of the wrapper logic components at least one of the wrapper logic components of the library that has a parameter value below a predetermined threshold;

disassembling the decompiled application package to provide disassembled code;

inserting wrapper program hooks into the disassembled code to provide modified disassembled code;

assembling the modified disassembled code to provide modified assembled code; and combining the wrapper logic components of the set with the modified assembled code to form a wrapped application package comprising executable code from the modified assembled code and executable code from the wrapper logic components of the set that intercept calls by the executable code from the modified assembled code.

2. The method of claim 1, wherein excluding from the set of the wrapper logic components at least one of the wrapper logic components of the library that has a parameter value below the predetermined threshold, comprises:

excluding from the set of the wrapper logic components all of the wrapper logic components of the library that have a parameter value below the predetermined threshold.

3. The method of claim 1, wherein determining the resources of the host user device that the application package will use based on the permissions contained in the manifest file that the application requests to access, comprises:

identifying associations between labels identified by the permissions to resources that have been defined as being associated with wrapper logic components of the library.

4. The method of claim 1, wherein selecting the set of the wrapper logic components from among the library of wrapper logic components based on the features of the application package, further comprises:

comparing the permissions contained in the manifest file that the application requests to access to a list of prohibited permissions; and excluding from the set of the wrapper logic components all of the wrapper logic components of the library that request to access a permission that is among the list of prohibited permissions.

5. The method of claim 1, wherein identifying features of the application package based on content of the decompiled application package, comprises:

identifying characteristics of application interfaces of the decompiled application code of the decompiled application package; and identifying the features of the application package based on the characteristics of the application interfaces of the decompiled application code of the decompiled application package.

6. The method of claim 1, wherein:

the library comprises a software development kit library; and selecting the set of wrapper logic components from among the library of wrapper logic components based on the features of the application package, comprises:

generating a modified software development kit library containing the set of wrapper logic components selected from among the software development kit library of wrapper logic components, determining, for each feature, the parameter value, and excluding from the modified software development kit library at least one of the wrapper logic components of the software development kit library that has a parameter value below the predetermined threshold.

7. The method of claim 6, wherein combining the wrapper logic components of the set with the modified assembled code to form the wrapped application package, comprises:

retrieving all of the wrapper logic components of the set from the modified software development kit library for combining with the modified assembled code to form the wrapped application package.

8. A computing device, comprising:

a processor; and a memory coupled to the processor and storing computer readable program code that when executed by the processor causes the processor to perform operations comprising:

decompiling executable code of an application package to provide a decompiled application package;

tracing a plurality of operational flows through decompiled application code of the decompiled application package, each operational flow associated with at least one application programming interface (API) of the decompiled application package;

identifying features of the application package based on content of the decompiled application package, by obtaining a manifest file from the decompiled application package, and determining resources of a host user device that the application package will use based on permissions contained in the manifest file for at least one API call of the API associated with a request by the application to access the feature;

selecting a set of wrapper logic components from among a library of wrapper logic components based on the features of the application package, by:

determining, for each feature, a parameter value representative of a number of operational flows of the application package contain an API call associated with a request by the application to access the feature; and excluding from the set of the wrapper logic components at least one of the wrapper logic components of the library that has a parameter value below a predetermined threshold;

disassembling the decompiled application package to provide disassembled code;

inserting wrapper calling hooks into the disassembled code to provide modified disassembled code;

assembling the modified disassembled code to provide modified assembled code; and combining the wrapper logic components of the set with the modified assembled code to form a wrapped application package comprising executable code from the modified assembled code and executable code from the wrapper logic components of the set that intercept calls by the executable code from the modified assembled code.

9. The computing device of claim 8, wherein excluding from the set of the wrapper logic components at least one of the wrapper logic components of the library that has a parameter value below the predetermined threshold, comprises:

excluding from the set of the wrapper logic components any of the wrapper logic components of the library that have a parameter value below the predetermined threshold.

10. The computing device of claim 8, wherein selecting the set of the wrapper logic components from among the library of wrapper logic components based on the features of the application package, further comprises:

comparing the permissions contained in the manifest file that the application requests to access to a list of prohibited permissions; and excluding from the set of the wrapper logic components all of the wrapper logic components of the library that request to access a permission that is among the list of prohibited permissions.

* * * * *